United States Patent

Kress et al.

[11] Patent Number: 5,746,549
[45] Date of Patent: May 5, 1998

[54] METAL CUTTING TOOL

[75] Inventors: Dieter Kress, Aalen; Friedrich Häberle, Lauchheim, both of Germany

[73] Assignee: Mapal Fabrik für Präzisionswerkzeuge Dr. Kress KG, Aalen, Germany

[21] Appl. No.: 699,718

[22] Filed: Aug. 29, 1996

Related U.S. Application Data

[63] Continuation of Ser. No. 263,278, Jun. 21, 1994.

[30] Foreign Application Priority Data

Jun. 21, 1993 [DE] Germany ............... 43 20 409.0

[51] Int. Cl.[6] .................................................. B23P 15/28
[52] U.S. Cl. .......................... 407/102; 279/79; 407/53; 408/239 R
[58] Field of Search .................................. 407/102, 103, 407/109; 408/713, 231, 239 R; 279/79, 80, 89

[56] References Cited

U.S. PATENT DOCUMENTS

| | | | |
|---|---|---|---|
| 1,052,077 | 2/1913 | Mcmillan | 279/79 |
| 1,542,007 | 6/1925 | Schroeder | |
| 2,336,095 | 12/1943 | Heding | 279/79 |
| 2,540,937 | 2/1951 | Edens | 279/79 |
| 3,057,609 | 5/1962 | Krekeler | 82/158 |
| 3,078,547 | 2/1963 | Sweet | 407/71 |
| 3,347,293 | 10/1967 | Clark | 279/79 |
| 3,997,951 | 12/1976 | Williscraft | 407/105 |
| 5,607,263 | 3/1997 | Nespeta et al. | 407/53 |

FOREIGN PATENT DOCUMENTS

| | | |
|---|---|---|
| 0114112 | 7/1984 | European Pat. Off. ............... 407/109 |
| 1032529 | 7/1953 | France . |
| 2191965 | 2/1974 | France . |
| 113831 | 3/1918 | United Kingdom . |
| 271208 | 5/1927 | United Kingdom . |
| 2004211 | 3/1979 | United Kingdom . |

*Primary Examiner*—Andrea L. Pitts
*Assistant Examiner*—Mark Williams
*Attorney, Agent, or Firm*—Anderson Kill & Olick, P.C.

[57] ABSTRACT

A metal cutting including a tool head, a cutting plate, and a snap-locking arrangement for securing the cutting plate to the tool head and formed of a projection, extending from the cutting plate or the bottom of the cavity, which is formed in tool head for receiving the cutting plate, into a hole formed, respectively, in the bottom of the tool head cavity or in the cutting plate, and a snap-action locking element located in the hole for engaging the projection and retaining it in the hole.

16 Claims, 2 Drawing Sheets

METAL CUTTING TOOL

This is a continuation of application Ser. No. 08/263,278, filed Jun. 21, 1994.

BACKGROUND OF THE INVENTION

The present invention relates to a metal cutting tool having a tool head, a cutting plate and a fastening element for securing the cutting plate to the tool head.

In the metal cutting tool of the above-described type, the cutting plate may be secured on the tool head with a clamping claw which fastens the cutting plate in a cavity formed in the tool head by applying pressure to the outer face of the cutting plate also called a cutting face.

The clamping claw is located in the clearance space designed for removal of chips from the cutting plate. When the tools have small dimensions, such claws significantly hinder their operation. The claws cause frequent congestion of chips which may damage the machined surface and, thus, adversely affect the quality of the machined surface.

In the tool of the above-described type, the cutting plate can also be secured to the tool head with a fastening element extending through a through-hole formed in the cutting plate. The fastening element is usually a screw which is screwed in a threaded hole formed in the tool head. Providing a through-hole in a cutting plate weakens the cutting plate. If the size of the cutting plate is small, forming of the through-bore can result in breaking of the cutting plate. In both cases of fastening of a cutting plate to a tool head, replacement of a cutting plate is rather inconvenient and time consuming.

Accordingly, an object of the invention is a metal cutting tool in which the cutting plate can be reliably and easily secured to the tool head.

SUMMARY OF THE INVENTION

This and other objects of the invention, which will become apparent hereinafter, are achieved by providing snap-action fastening or locking means which insure a reliable and, at the same time, easy fastening of the cutting plate to the tool head.

Especially advantageous is an embodiment of a metal cutting tool in which there is provided a projection received in a hole in which a locking element is located, which locking element applies to a lock surface formed on the projection a tension force that provides for retaining of the cutting plate in the tool head. The snap-action locking means have a simple structure and, therefore, are not subjected to malfunction.

In an advantageous embodiment of the invention, an annular groove is formed in the wall of the projection receiving hole for receiving a spring washer acting as the locking element. The spring washer applies a locking force to the locking surface of the projection which pulls the cutting plate into the plate receiving cavity formed in the tool head and reliably secures the cutting plate in the cavity. Such snap-action locking arrangement can be produced rather inexpensively so that it is very economical and at the same time, very reliable.

It is especially advantageous when the projection extends from a bottom face of the cutting plate and the projection receiving hole is formed in the body of the tool head. The cutting plate in this case is characterized by a high stability as no holes or recesses are formed in the cutting plate. The projection gives the cutting plate a particular rigidity. This provides a particular advantage for a cutting plate having small dimensions.

The locking means, according to the present invention, also enables lateral displacement of the cutting plate in a predetermined direction. The tension forces acting on the cutting plate not only retain the cutting plate secured to the tool head but also shift it in a predetermined direction. This insures a good contact between the cutting plate and the support surface of the tool head and a predetermined orientation of the cutting plate.

Advantageously, the metal cutting tool according to the present invention is provided with an adjusting element. The adjusting element insures position adjustment of the cutting plate which permits to take into account the dimension of the machined surface.

It is especially advantageous that, when the metal cutting tool is a reamer, the adjusting element enables compensation, in a certain range, of wear of the cutting plate. The adjusting device also enables precise positioning of the cutting plate in accordance with a machined dimension.

Also, according to the invention, the metal cutting tool is provided with a simple plate ejection device.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
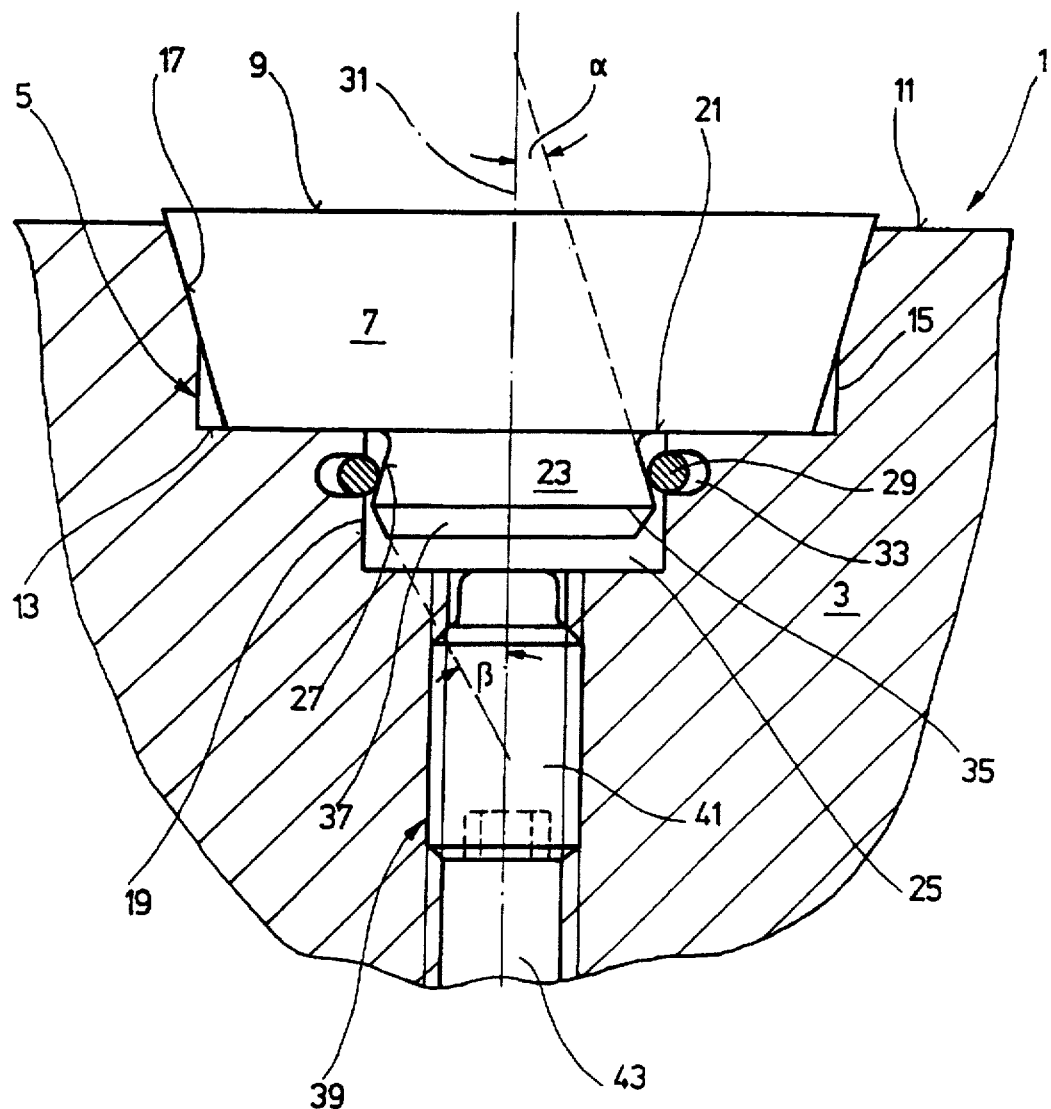
FIG. 1 shows a partial cross-sectional view of a first embodiment of a metal cutting tool according to the present invention.

The present invention will be discussed with reference to a reamer which is shown in the drawings and is taken as an example of a metal cutting tool the present invention relates to. However, it should be noted that the present invention relates to any type of tool, e.g., a drill, a mill and the like, provided with a cutting plate for machining workpieces which is held in the tool head with a fastening arrangement.

FIG. 1 shows a partial cross-sectional view of a reamer 1 having a head body 3. The head body 3 has a cavity 5 the outer contour of which preferably corresponds to the configuration of a cutting plate 7.

The depth of the cavity 5 is so selected that the cutting plate only slightly projects therefrom, and the outer surface or cutting face 9 of the cutting plate 7 practically smoothly merges into the outer surface of the head body 3. The bottom 13 of the cavity 5 can serve as an abutment surface for the cutting plate 7.

In the embodiment shown in FIG. 1, the bottom 13 is so formed that the cutting plate 7 abuts it along its entire bottom surface. The side surfaces 15 of the cavity 5 are at least partially conical, i.e., the side surfaces at least partially extend at an angle to a perpendicular to the surface 11 so that they form an angle opening toward the outer surface 11 of the cutting plate. The inclination of the side surfaces 15 of the cavity 5 are selected so that it is identical to the inclination of side surfaces 17 of the cutting plate 7. This means that the cutting plate is securely retained between the side surfaces 15.

The metal cutting tool, as the reamer shown in FIG. 1, is equipped with a fastening arrangement 19 for securing the cutting plate 7 in the head body 3 of the reamer 1. The fastening arrangement 19 includes a projection 23 secured to the bottom side 23 of the cutting plate 7 and extending into a hole 25 in the head body 3 of the reamer 1. The projection 23 has at least one lock surface 27 engageable by an appropriate locking element or member 29.

The projection 23 has a configuration substantially corresponding to the contour of the hole 25. The projection 23 has a substantially cylindrical shape and extends into a circular hole 25. The length of the projection 23 is so selected that its bottom surface does not contact the bottom of the hole 25 in mounted condition of the cutting plate 7.

The lock surface 27 can be formed of a plurality of separate surfaces. In the embodiment of FIG. 1, the lock surface 27 is formed as a continuous circular surface and represents a portion of an outer surface of a ball. The lock surface 27 forms with an axis 31 of the projection 23 an angle of 0°–25°, preferably 10°–20° and, most preferably, about 15°.

The locking element 29 is an elastic element and is formed preferably as a lock washer preloaded to such an extent that its inner diameter, when the projection 23 does not extend into the hole 25, is less than the diameter of the abutting surface of the locking element 29 which engages the lock surface 27 of the projection 23 when it extends into the hole 25. The lock washer forming the locking element may be substantially circular but slightly serpentine-shaped.

In the mounting condition of the cutting plate 7, the lock washer or the locking element 29 applies to the lock surface 27 a force in a direction substantially perpendicular to the axis 31. Because of an inclination of the lock surface 27, the pressure force of the locking element 29 splits into several components, one of which acts along the axis 31 to pull the cutting plate 7 into the cavity 5. The locking element 29 acting on the lock surface 27 provides a tension force directed in a downward direction in FIG. 1, which results in pulling of the cutting plate 7 into the cavity 5.

The locking element 29 is received in an annular groove 33 formed in the inner wall of the hole 25. When the locking element 29 braces the projection 23, it is supported on the upper surface of the groove 33, the width of which is so selected that the locking element 29 is displaceable therein with little friction. The depth of the groove 33 is so selected that the locking element 29 can be displaced into the groove so that the projection 23 can be inserted into the hole 25 against the spring force of the locking element 29.

The lock surface 27 is limited, at a side thereof remote from the bottom surface 21 of the cutting plate 7, by a shoulder 35 which is so formed that it provides a run-on bevel 37 which can be formed of separate facets for engaging the locking element 29 when the projection 23 is inserted into the hole 25. In the embodiment of FIG. 1, the run-on bevel 37 is formed as a circular surface representing a portion of an outer surface of a ball. The run-on bevel 37 forms with the axis 31 an angle 3 of about 10°–60°, preferably of 20°–45° and most preferably 35°. This angle is so selected that the locking element 29 can easily be displaced into the groove 33 upon insertion of the projection 23 into the hole 25.

The distance between the shoulder 35 from the bottom side 21 of the cutting plate 7 is so selected that, in the mounting condition of the cutting plate 7 in the head body 3, the shoulder 35 is located beneath the operational region of the locking element 29 so that the locking element 29 can act on the lock surface 27.

As shown in FIG. 1, the outer diameter of the projection 23 is smaller than the diameter of the hole 25 so that the projection 23 can be shifted in the hole 25. The purpose of this will be discussed below.

The reamer 1 is provided with an ejection element 39 which can apply to the cutting plate 7 an ejection force acting against the tension force applied by the locking element 29. The ejection element 29 in the described embodiment is formed as a screw with an outer thread which cooperates with an inner thread of bore 43 formed in the head body 3 beneath the hole 25. The bore 43 opens into the hole 25 so that the screw can act on the projection 27. It is also possible to provide an ejection element acting on any portion of a bottom surface 21 of the cutting plate 7. However, the projection 23 represents an especially stable region of the cutting plate 7 so that an ejection force can be applied to the projection 23 without danger of damaging the cutting plate.

In FIG. 1, the screw 41 is shown in its withdrawn position. For removing the cutting plate 7, the screw 41 is advanced in the direction of the axis 31 upward and engages the bottom surface of the projection 23 to apply an ejection force to the cutting plate 7. The bore 43 is a through-bore so that the screw 41 is readily accessible.

From the functioning of the locking element 29 formed as a lock washer, it is apparent that instead of the continuous annular groove 33, the head body may be provided with one and preferably, several bores having their axes extending at an angle, preferably perpendicular to the axis 31 and opening into the hole 25. In this case the locking element 29 can be formed as one or several, as the case may be, balls located in respective bores and spring-biased into engagement with the lock surface 27. Instead of balls, preloaded pins, in particular spring bolts, can be inserted into these bores for applying a tension force to the lock surface 27. Generally, the tension force applied to the lock surface 27 reliably secures the cutting plate 7 in the head body 3.

From the foregoing discussion, it should be clear that the locking force need not be uniformly applied from all directions to the lock surface 27. Therefore, the lock washer may be made open from one side or be formed of separate annular sections which, on one side, abut the bottom of the groove 33 and, on the other side, apply a tension force to the lock surface 27. When the spring-biased balls or spring bolts are used as a locking element, they may apply different tension forces so that the projection 23 can be shifted relative to the axis 31.

A non-uniform loading of the cutting plate 7 which leads to shifting of the cutting plate in a certain direction, can be obtained, when a lock washer is used as a locking element, by placing in several sections of the annular groove 33 an elastic backing material. It is also possible to form the bottom 13 of the cavity 5, as well as the bottom surface 21 of the cutting plate 7, so that it does not lie in a plane extending perpendicularly to the axis 31, but extends at an angle to the axis 31. In this case, with the tensioning force acting in the direction perpendicular to the axis 31, the cutting plate 7 would slide along an inclined surface formed by the bottom 13 of the cavity 5 or the bottom surface 21 of the cutting plate 7 in a predetermined direction.

If the locking element 29 is designed for application a non-uniform tension force to the cutting plate 7, the contour of the cavity 5 should be so selected that displacement of the cutting plate 7 becomes possible. By using a non-uniform tension force acting in a predetermined direction, it can be assured that the side surfaces 17 of the cutting plate 7 properly abut respective side surfaces 15 of the cavity 5. To enable this, as was discussed previously, the outer diameter of the projection 23 is selected less than the inner diameter of the hole 25.

From the operational standpoint of cooperation between the locking element 29 and the lock surface 27 of the projection 23, it is possible to provide a cutting plate having a hole into which a projection formed in the head body extends. However, it is to be pointed out that when a hole is formed in the cutting plate, the latter is weakened even if the hole is formed as a blind hole. But when the cutting plate has a sufficient thickness, providing a projection receiving hole in the cutting plate is possible.

It is further to be pointed out that providing a cutting plate with a lock projection stabilizes the same even if the dimensions of the cutting plate are small. This is because providing a projection results in reinforcing of the cutting plate. The fastening arrangement shown in FIG. 1 should be especially unconditionally used for cutting plates with small dimensions.

Also, the locking element 29 can act directly on the side surfaces of the cutting plate if they are provided, at least partially with locking surfaces forming an angle which opens toward the bottom surface of the cutting plate. In this case, the locking element 29 should be located in a groove formed in the side surface 15 of the cavity 5. In this case there is no need to form a hole in the head body 3, which presents an advantage when the reamer has a small diameter, so that the reamer body is not weakened.

Accordingly, in the embodiment of the invention shown in FIG. 1, when a cutting plate 7 needs to be secured in the head body 3 of the reamer 1, the cutting plate 7 is inserted into the cavity 5 with the projection 23 extending into the hole 25. When a pressure is applied to cutting face 9 of the cutting plate 7, the run-on bevel 37 displaces the locking element 29 into the groove 33. After the shoulder 35 moves past the groove 33, the locking element 29 is biased by resilient means against the lock surface 27. The locking element 29 applies a tension force to the projection 23, which has at least one force component which pulls the cutting plate 7 into the cavity 5 until the bottom surface 21 of the cutting plate 7 abuts the bottom 13 of the cavity 5, or until the side surfaces 17 of the cutting plate 7 abut the side surfaces 15 of the cavity 5 to such an extent that further movement of the cutting plate into the cavity 5 is not possible.

The cutting plate 7 is retained in the head body 3 by tension forces applied to the lock surface 27. No other fastening element is needed. There is no need for fastening screws the openings for which, when provided in the cutting plate, weaken the cutting plate. There is no need for any tensioning claws acting on the outer surface 9 of the cutting plate and which limit the working space of the cutting face of the cutting plate and the outer surface of the head body.

Operationally, the fastening arrangement 19 is similar to a pressure knob. That is, after the shoulder 35 is displaced past the groove 33, the locking element 29 snaps into place and holds the cutting plate 7. To remove the cutting plate 7, the screw 41 is advanced against the projection 23 and displaces it out of the hole 25. As soon as the shoulder 35 moves past the locking element 29, the locking element 29 acts on the run-on bevel 37 and ejects the cutting plate 7 out of the cavity 5. The fastening arrangement, according to the present invention, acts as a snap device that reliably secures the cutting plate in the head body of a reamer.

Figure 2:
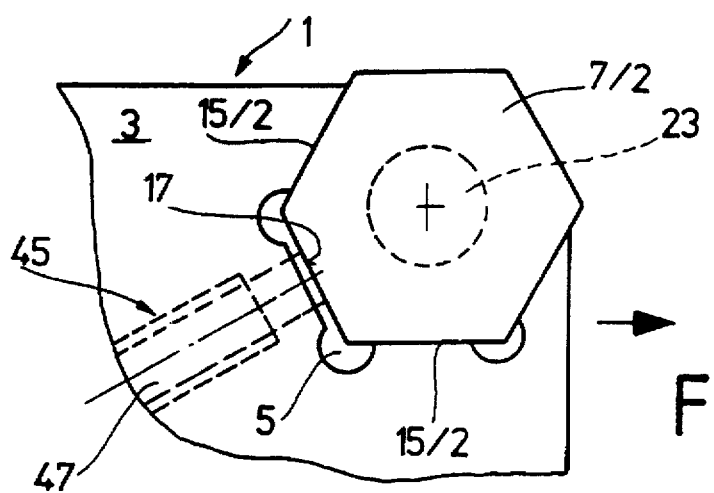
FIG. 2 shows a partial plan view of a second embodiment of a metal cutting tool according to the present invention.
Figure 3:
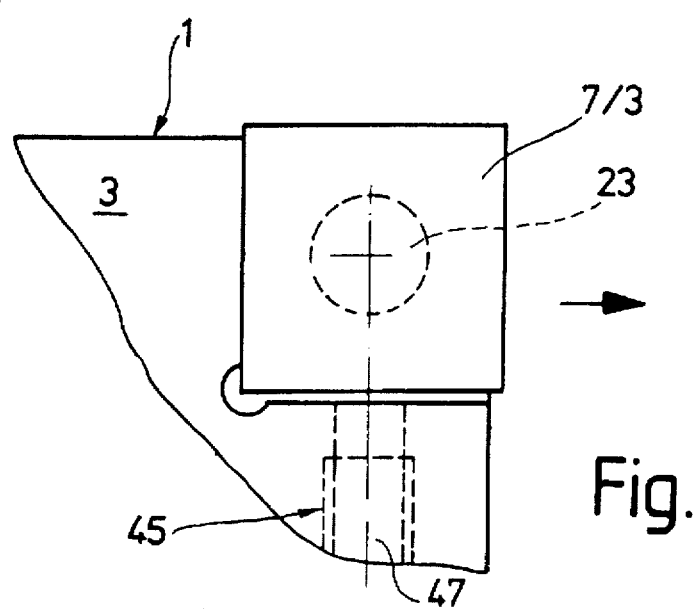
FIG. 3 shows a partial plan view of a third embodiment of a metal cutting tool according to the present invention.
Figure 4:
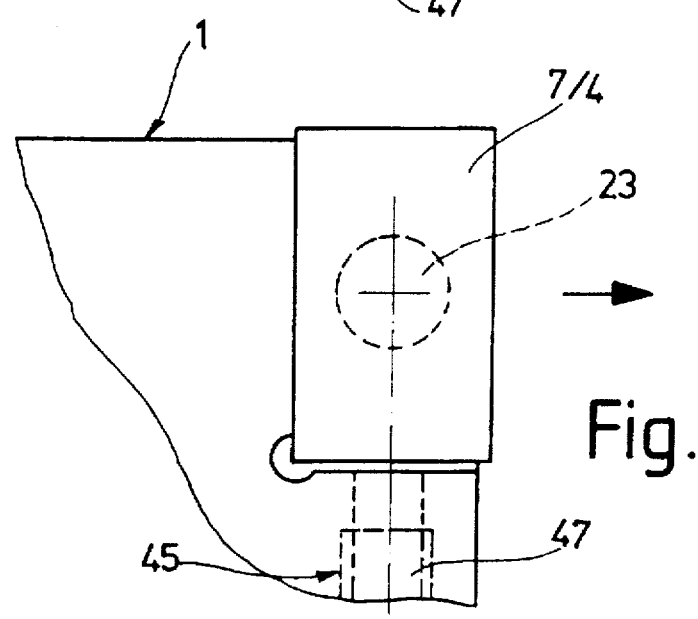
FIG. 4 shows a fourth embodiment of a metal cutting tool according to the present invention.

The metal cutting tool shown in FIGS. 2–4 is also a reamer. In FIGS. 2–4, the parts identical with those of FIG. 1 are designated with the same reference numerals.

FIGS. 2–4 show a plan view of a cutting plate. The cutting plate, which is shown in FIG. 2, is formed as a hexagonal and is secured in a cavity 5. There is no need for the side wall of the cavity 5 to completely surround the cutting plate 7. The projection 23 is provided in the center of the cutting plate. A locking element (not shown) applies a tension force to the cutting plate 7 such that the cutting plate is drawn against the side surface 15 of the cavity 5.

In the embodiment of FIG. 2, there is provided an adjusting element 45 which provides an adjusting force for compensating a drift force acting on the cutting plate. The adjusting element 45 can be formed, e.g., as an adjusting screw having an end surface for engaging a side surface 17 of the cutting plate 7 directly or through an adjusting wedge, for acting against the drift force.

The cutting plate 7 shown in FIG. 3 is square. It is also provided with a projection 23 which likewise forms part of a fastening arrangement that retains the cutting plate in the head body 3 of the reamer 1. The locking element (not shown) pulls the cutting plate downward in a manner described with reference to FIG. 1. As the embodiment of FIG. 2, this embodiment is also provided with an adjusting element 45 formed as a screw 47. The adjusting element 45 is designed for positioning of the cutting plate in accordance with a diameter of a workpiece to be machined with the reamer.

The cutting plate, shown in FIG. 4, has a rectangular shape and is also provided with a lock projection 23. This embodiment is likewise provided with an adjusting element 45 formed as a screw 47 for positioning the cutting plate.

In the embodiments of a reamer which are shown in FIGS. 2–4, the cutting plate is displaced, during machining of a bore, from left to right as indicated by arrows, with the reamer rotating in a clockwise direction. It is, of course, possible to hold the reamer stationary and to rotate a workpiece. In all cases, the cutting plates project beyond the side and front surfaces of the tool to be able to engage the machined surface.

FIGS. 2–4 show that the fastening arrangement described in detail with reference to FIG. 1, has a universal application, that is, its application does not depend on the shape of the cutting plate. In all cases, easy and reliable securing of a cutting plate in the head body of a metal cutting tool is insured, which securing is effected with a simple latch-type, locking element. To this end, the cutting plate should be provided with a projection for extending into a hole formed in the body of a reamer or other tool. As soon as the projection passes a predetermined location, the locking element snaps into its locking position and reliably holds the cutting plate in the reamer.

The snap locking element is actuated as soon as the largest diameter of the projection is displaced past it and acts on the lock surface of the projection, applying a tension force thereto. The force acting on the cutting plate during a machining operation, press the cutting plate against the bottom of the cavity in which the cutting plate is received and, as a result, the tension forces applied by the latch-type locking element are sufficient for reliably securing the cutting plate in the tool.

While the present invention was shown and described with reference to the preferred embodiments, various modifications thereof will be apparent to those skilled in the art and, therefore, it is not intended that the invention be limited to the disclosed embodiments and/or details thereof, and departures may be made therefrom within the spirit and scope of appended claims.

We claim:

1. A metal cutting tool for a chip-type machining process, comprising:

a tool head;

a cutting plate; and snap-action locking means for securing said cutting plate in said tool head, wherein said snap-action locking means comprises a projection having a locking surface and extending from one of a bottom of a hole, which is formed in said tool head for receiving said cutting plate, and a bottom face of said cutting plate, a hole formed in another one of said bottom and said bottom face for receiving said projection, and an elastic locking element located in said hole for applying a locking force to said locking surface of said projection.

2. A metal cutting tool as set forth in claim 1, wherein said hole has a wall provided with a sink for receiving said locking element.

3. A metal cutting tool as set forth in claim 2, wherein said sink is formed as one of an annular groove and a bore having an axis extending at an angle to an axis of said hole.

4. A metal cutting tool as set forth in claim 2, wherein said locking element comprises a spring element located in said sink.

5. A metal cutting tool as set forth in claim 4, wherein said sink is formed as an annular groove, and said spring element is formed as a spring washer located in said groove.

6. A metal cutting tool as set forth in claim 1, wherein said lock surface defines an angle of 0°–25° opening toward a bottom face of said cutting plate.

7. A metal cutting tool as set forth in claim 6, wherein said angle is 10°–20°.

8. A metal cutting tool as set forth in claim 6, wherein said angle is about 15°.

9. A metal cutting tool as set forth in claim 1, wherein said projection has an end surface provided with a run-on bevel which, upon insertion of said projection in said hole, engages said locking element and displaces said locking element to an unlocking position thereof, said run-on bevel defining an angle of 10°–60° opening toward a bottom face of said cutting plate.

10. A metal cutting tool as set forth in claim 9, wherein said angle is 25°–40°.

11. A metal cutting tool as set forth in claim 9, wherein said angle is about 35°.

12. A metal cutting tool as set forth in claim 1, wherein said projection is substantially cylindrical, and said hole is circular.

13. A metal cutting tool as set forth in claim 1, wherein said locking force displaces said cutting plate in a predetermined direction.

14. A metal cutting tool as set forth in claim 1, further comprising adjusting means for positioning said cutting plate in said tool head.

15. A metal cutting tool as set forth in claim 14, wherein said adjusting means effects displacement of said cutting plate in a direction opposite to a direction of drift forces applied to said cutting plate by said locking means.

16. A metal cutting tool as set forth in claim 1, further comprising ejection means for ejecting said cutting plate.

* * * * *